United States Patent
Dolgov et al.

(10) Patent No.: US 9,290,181 B1
(45) Date of Patent: *Mar. 22, 2016

(54) DETECTING AND RESPONDING TO TAILGATERS

(71) Applicant: Google Inc., Mountain View, CA (US)

(72) Inventors: Dmitri A. Dolgov, Los Altos, CA (US); Philip Nemec, San Jose, CA (US); Anne Kristiina Aula, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,053

(22) Filed: May 4, 2015

Related U.S. Application Data (63) Continuation of application No. 14/320,824, filed on Jul. 1, 2014, now Pat. No. 9,050,977, which is a continuation of application No. 14/096,613, filed on Dec. 4, 2013, now Pat. No. 8,818,682, which is a continuation of application No. 13/949,894, filed on Jul. 24, 2013, now Pat. No. 8,818,681.

(51) Int. Cl.
*G06F 17/00* (2006.01)
*B60W 30/16* (2012.01)

(52) U.S. Cl.
CPC .................... *B60W 30/16* (2013.01)

(58) Field of Classification Search
CPC ........... G08G 1/19; G08G 1/142; G08G 9/02; H04J 3/00; H04L 12/413; B60Q 2300/43; B60R 16/00; B60W 16/00; B60K 31/0058
USPC .............. 340/435, 436, 467, 901, 903, 933, 340/426.16, 427; 180/167; 455/500
See application file for complete search history.

(56) References Cited

U.S. PATENT DOCUMENTS

| | | | | |
|---|---|---|---|---|
| 5,959,572 | A | * | 9/1999 | Higashimata et al. .......... 342/70 |
| 7,486,176 | B2 | | 2/2009 | Bhogal et al. |
| 7,554,435 | B2 | | 6/2009 | Tengler et al. |
| 7,782,228 | B2 | | 8/2010 | Maxwell et al. |
| 8,346,426 | B1 | | 1/2013 | Szybalski et al. |
| 8,352,110 | B1 | | 1/2013 | Szybalski et al. |

(Continued)

OTHER PUBLICATIONS

Lamia Iftekhar, Safety-Aware Intelligent Transportation Systems: Cooperative Autonomous Driving for Vehicular Networks, Jun. 2012.

(Continued)

*Primary Examiner* — McDieunel Marc
(74) *Attorney, Agent, or Firm* — Lerner, David, Littenberg, Krumholz & Mentlik, LLP (57) ABSTRACT

An autonomous vehicle detects a tailgating vehicle and uses various response mechanisms. A vehicle is identified as a tailgater based on whether its characteristics meet a variable threshold. When the autonomous vehicle is traveling at slower speeds, the threshold is defined in distance. When the autonomous vehicle is traveling at faster speeds, the threshold is defined in time. The autonomous vehicle responds to the tailgater by modifying its driving behavior. In one example, the autonomous vehicle adjusts a headway buffer (defined in time) from another vehicle in front of the autonomous vehicle. In this regard, if the tailgater is T seconds too close to the autonomous vehicle, the autonomous vehicle increases the headway buffer to the vehicle in front of it by some amount relative to T.

20 Claims, 8 Drawing Sheets

(56) References Cited

U.S. PATENT DOCUMENTS

| | | |
|---|---|---|
| 8,433,470 B1 | 4/2013 | Szybalski et al. |
| 8,818,681 B1 * | 8/2014 | Dolgov et al. .................. 701/96 |
| 8,818,682 B1 * | 8/2014 | Dolgov et al. .................. 701/96 |
| 9,050,977 B1 * | 6/2015 | Dolgov et al. |
| 2004/0236596 A1 | 11/2004 | Chowdhary et al. |
| 2009/0256698 A1 | 10/2009 | Bonilla |
| 2011/0087525 A1 | 4/2011 | Boss et al. |
| 2011/0093177 A1 | 4/2011 | Horn |
| 2012/0310518 A1 | 12/2012 | Chen et al. |
| 2013/0057397 A1 | 3/2013 | Cutler et al. |
| 2013/0151058 A1 | 6/2013 | Zagorski et al. |
| 2013/0187771 A1 | 7/2013 | Rothschild |
| 2013/0215273 A1 | 8/2013 | Kareev et al. |

OTHER PUBLICATIONS

"Lane-Swapping Helps Autonomous Vehicles Avoid Collisions, Study Finds" [online], "http://phys.org/news/2013-01-lane-swapping-autonomous-vehicles-collisions.html", Jan. 28, 2013, 1 page.

* cited by examiner

DETECTING AND RESPONDING TO TAILGATERS

CROSS REFERENCE TO RELATED APPLICATION

This application is a continuation of U.S. patent application Ser. No. 14/320,824, filed on Jul. 1, 2014, which is a continuation of U.S. patent application Ser. No. 14/096,613, filed on Dec. 4, 2013, which is a continuation of U.S. patent application Ser. No. 13/949,894, filed on Jul. 24, 2013, the entire disclosures of which are incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual driving mode (where the operator exercises a high degree of control over the movement of the vehicle) to an autonomous driving mode (where the vehicle essentially drives itself) to modes that lie somewhere in between.

Safety and comfort of passengers is an important goal of an autonomous vehicle system. Vehicles that follow others at short range or "tailgaters" can present safety and comfort issues for passengers of autonomous vehicles.

BRIEF SUMMARY

Aspects of the disclosure provide a method of controlling a first vehicle. The method includes detecting a second vehicle behind the first vehicle; determining that the second vehicle is a tailgater based on a comparison of the distance threshold to a distance between the possible tailgater and the first vehicle; determining, by a processor, a difference in distance between a distance threshold and the distance between the second vehicle and the first vehicle; determining an amount of time for the first vehicle to travel the difference; increasing a minimum headway buffer defined in time between the first vehicle and a third vehicle in front of the first vehicle using the amount of time; and controlling the first vehicle based on the increased minimum headway buffer.

In one example, the method also includes adjusting the minimum headway buffer based on any changes to the current speed of the first vehicle. In another example, the method also includes adjusting the minimum headway buffer based on any changes to the difference. In another example, the second vehicle is determined to be a tailgater when distance between the second vehicle and the first vehicle is less than the distance threshold. In this example, the method also includes adjusting the minimum headway buffer until the distance between the first vehicle and the tailgater is greater than or equal to the distance threshold. In another example, the method also includes selecting the distance threshold over a time threshold when the speed of the first vehicle is less than a speed threshold. In another example, the method also includes determining the distance threshold using a function of a distance threshold component, a time threshold component, and the current speed of the vehicle.

Another aspect of the disclosure provides a method of controlling a first vehicle. The method includes detecting a second vehicle behind the first vehicle; identifying the second vehicle as a possible tailgater; determining, by a processor, a difference in distance between the first vehicle and the possible tailgater; determining an amount of time for the first vehicle to travel the difference; determining that the possible tailgater is a tailgater based on a comparison of the amount of time to a time threshold; determining a difference in time between the time threshold and the amount of time; increasing a minimum headway buffer defined in time between the first vehicle and a third vehicle in front of the first vehicle using the difference; and controlling the first vehicle based on the increased minimum headway buffer.

In one example, the method also includes adjusting the minimum headway buffer based on any changes to the current speed of the first vehicle. In another example, the method also includes adjusting the minimum headway buffer based on any changes to the difference. In another example, the possible tailgater is determined to be a tailgater when the amount of time is less than the time threshold. In this example, the method also includes adjusting the minimum headway buffer until the amount of time is greater than or equal to the time threshold. In another example, the method also includes selecting the time threshold over a speed threshold when the speed of the first vehicle is greater than a speed threshold.

A further aspect of the disclosure provides a system for controlling a first vehicle. The system includes memory storing a distance threshold and a minimum headway buffer defined in time between the first vehicle and a third vehicle in front of the first vehicle. The system also includes a processor configured to: detect a second vehicle behind the first vehicle; determine that the second vehicle is a tailgater based on a comparison of the distance threshold to a distance between the possible tailgater and the first vehicle; determine a difference in distance between a distance threshold and the distance between the second vehicle and the first vehicle; determine an amount of time for the first vehicle to travel the difference; increase the minimum headway buffer by the amount of time; and control the first vehicle based on the increased minimum headway buffer.

In one example, the second vehicle is determined by the processor to be a tailgater when distance between the second vehicle and the first vehicle is less than the distance threshold. In another example, the processor is also configured to select the distance threshold over a time threshold when the speed of the first vehicle is less than a speed threshold. In another example, the processor is also configured to determine the distance threshold using a function of a distance threshold component, a time threshold component, and the current speed of the vehicle.

Another aspect of the disclosure provides a system. The system includes memory storing a time threshold for determining whether a vehicle is tailgating and a minimum headway buffer value defined in time between the first vehicle and a third vehicle in front of the first vehicle. The system also includes a processor configured to: detect a second vehicle behind the first vehicle; identifying the second vehicle as a possible tailgater; determine a difference in distance between the first vehicle and the possible tailgater; determine an amount of time for the first vehicle to travel the difference; determine that the possible tailgater is a tailgater based on a comparison of the amount of time to a time threshold; determine a difference in time between the time threshold and the amount of time; increase the minimum headway buffer by the difference; and control the first vehicle based on the increased minimum headway buffer.

In one example, the possible tailgater is determined by the processor to be a tailgater when the amount of time is less than the time threshold and the processor is further configured to adjust the minimum headway buffer until the amount of time is greater than or equal to the time threshold. In another example, the processor is further configured to select the time threshold over a speed threshold when the speed of the first vehicle is greater than a speed threshold.

DETAILED DESCRIPTION

The disclosure provides an adaptive approach for detecting a tailgating vehicle as well as various response mechanisms that may be used by an autonomous vehicle in response thereto. An autonomous vehicle may include vehicles having one or more semiautonomous or autonomous modes. Such vehicles may also include one or more manual driving modes.

According to one aspect, a vehicle may be identified as a tailgater based on whether its characteristics meet a variable threshold. When the autonomous vehicle is traveling at slower speeds, the threshold may be defined in terms of distance. When the autonomous vehicle is traveling at faster speeds, the threshold may be defined in terms of time.

Once a vehicle has been identified as a tailgater, the autonomous vehicle may provide various notifications. This may include notifying passengers of the autonomous vehicle audibly or visually, and/or notifying the tailgater visually that he or she is tailgating.

The autonomous vehicle may also respond by modifying its driving behavior. In one example, the autonomous vehicle may change lanes to avoid the tailgater. In another example, the autonomous vehicle may adjust the headway buffer from a vehicle in front of the autonomous vehicle. Alternatively, or in addition to adjusting the headway buffer, the vehicle may also adjust its braking profile or pattern in order to allow the tailgater to see the brake lights of the autonomous vehicle and may give the tailgater more time to realize the need to also brake aggressively.

In one example, before determining whether another vehicle is a tailgater, the autonomous vehicle may observe the vehicle for an observation period. If the other vehicle is driving slower than the autonomous vehicle, this observation period may allow the autonomous vehicle to eliminate false positives such as vehicles that are moving through a lane or increasing the distance between themselves and the autonomous vehicle.

Figure 1:
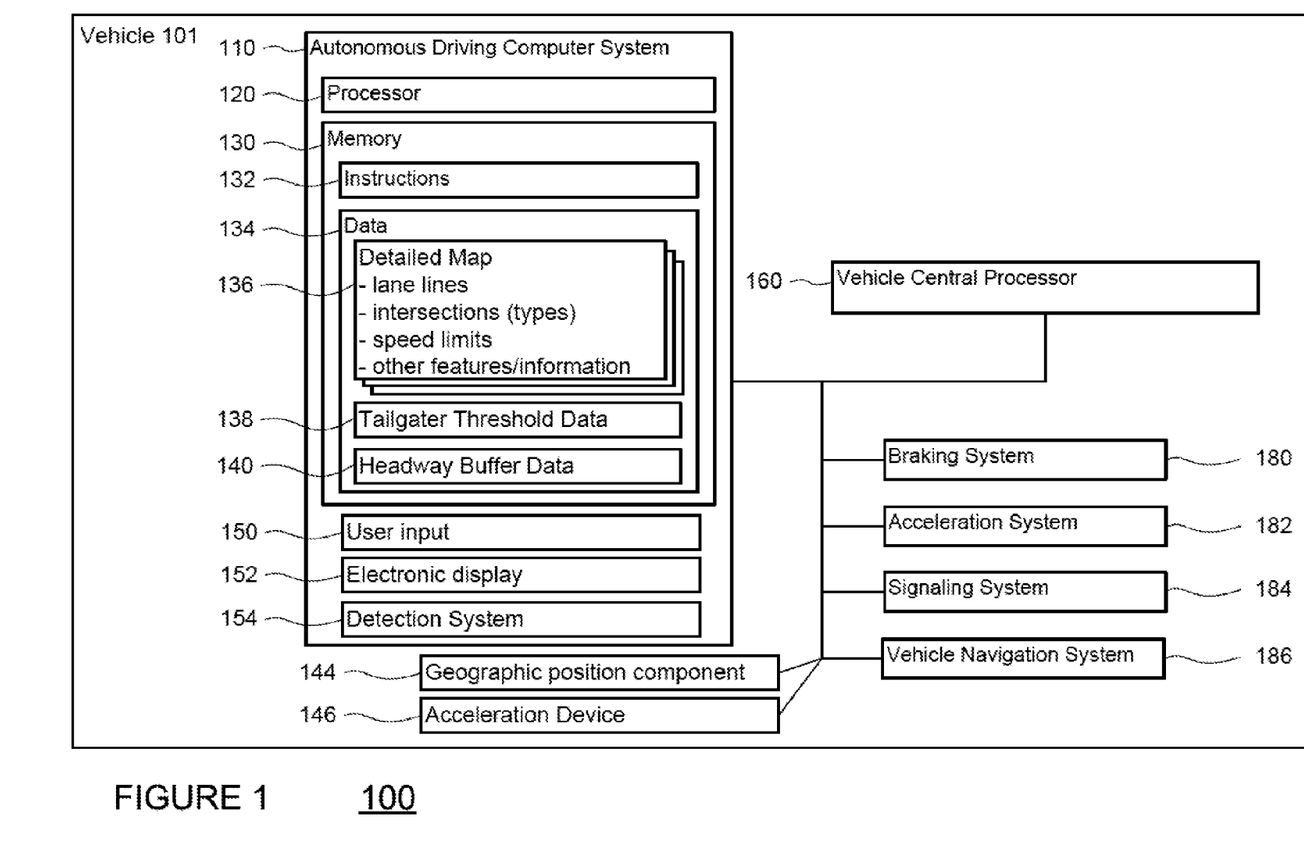
FIG. 1 is a functional diagram of a system in accordance with aspects of the disclosure.

As shown in FIG. 1, an autonomous driving system 100 associated with an autonomous vehicle. In this regard, vehicle 101 may include an autonomous vehicle. While certain aspects of the disclosure are particularly useful in connection with specific types of vehicles, the vehicle may be any type of vehicle including, but not limited to, cars, trucks, motorcycles, busses, recreational vehicles, amusement park vehicles, construction equipment, trams, trains, and trolleys.

The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 152 (e.g., a monitor having a screen, a small LCD touch-screen or any other electrical device that is operable to display information), user input 150 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
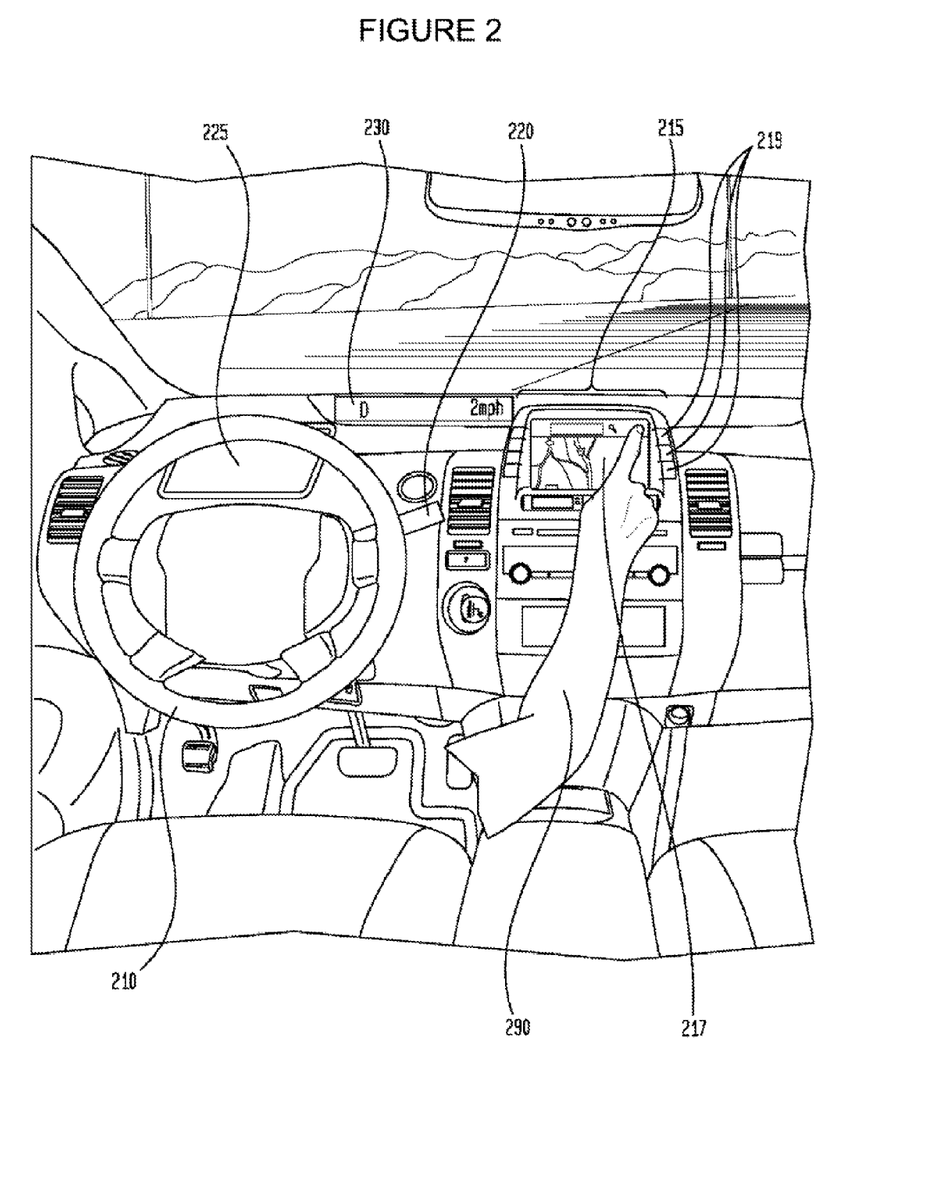
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 150 in addition to the foregoing, such as touch screen 217 (which may be a part of electronic display 152), or button inputs 219, for activating or deactivating one or more autonomous driving modes and for enabling a driver or passenger 290 to provide information, such as a navigation destination, to the autonomous driving computer 110.

The autonomous driving computing system may be capable of communicating with various components of the vehicle. For example, returning to FIG. 1, computer 110 may be in communication with the vehicle's central processor 160 and may send and receive information from the various systems of vehicle 101, for example the braking system 180, acceleration system 182, signaling system 184, and navigation system 186 in order to control the movement, speed, etc. of vehicle 101. In one example, the vehicle's central processor 160 may perform all of the functions of a central processor in a non-autonomous computer. In another example, processor 120 and 160 may comprise a single processing device or multiple processing devices operating in parallel.

In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it, which can often be determined with better accuracy than absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous driving mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system 154 may include lasers, sonar, radar, cameras or any other detection devices which record data which may be processed by computer 110. For example, if the vehicle is a small passenger vehicle, the car may include a laser mounted on the roof or other convenient location.

Figure 3:
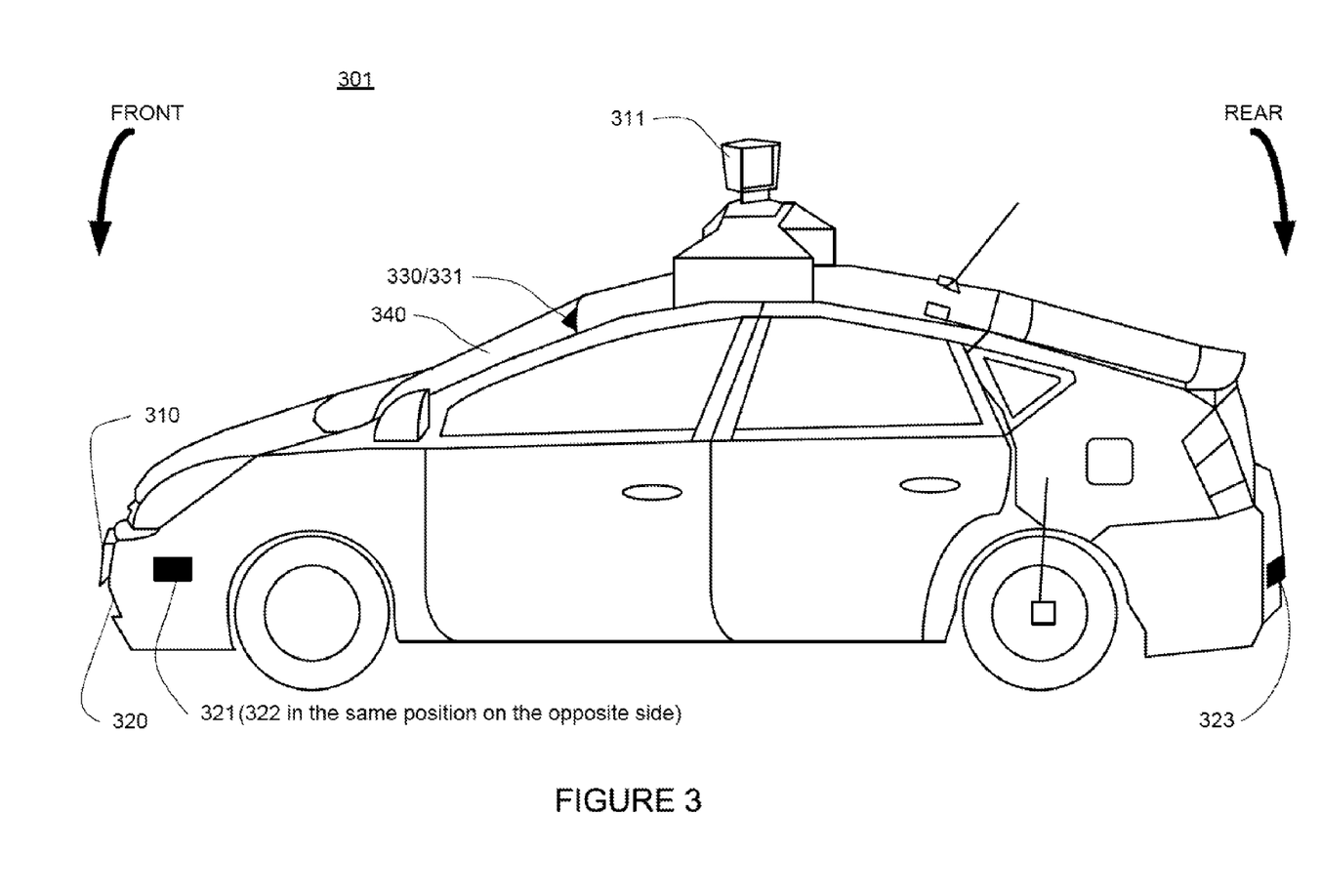
FIG. 3 is an exterior of an autonomous vehicle in accordance with aspects of the disclosure.

As shown in FIG. 3, vehicle 101 may include a small passenger vehicle having lasers 310 and 311, mounted on the front and top of the vehicle, respectively. Laser 310 may have a range of approximately 150 meters, a thirty degree vertical field of view, and approximately a thirty degree horizontal field of view. Laser 311 may have a range of approximately 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 3, vehicle 101 includes radar detection units 320-323 located on the side (only one side being shown), front and rear of the vehicle. Each of these radar detection units may have a range of approximately 200 meters for an approximately 18 degree field of view as well as a range of approximately 60 meters for an approximately 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 3, vehicle 101 may include 2 cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

In addition to the sensors described above, the computer may also use input from other sensors and features typical to non-autonomous vehicles. For example, these other sensors and features may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. This information may be provided directly from these sensors and features or via the vehicle's central processor 160.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information. For example, the map information may include explicit speed limit information associated with various roadway segments. The speed limit data may be entered manually or scanned from previously taken images of a speed limit sign using, for example, optical-character recognition.

Figure 4:
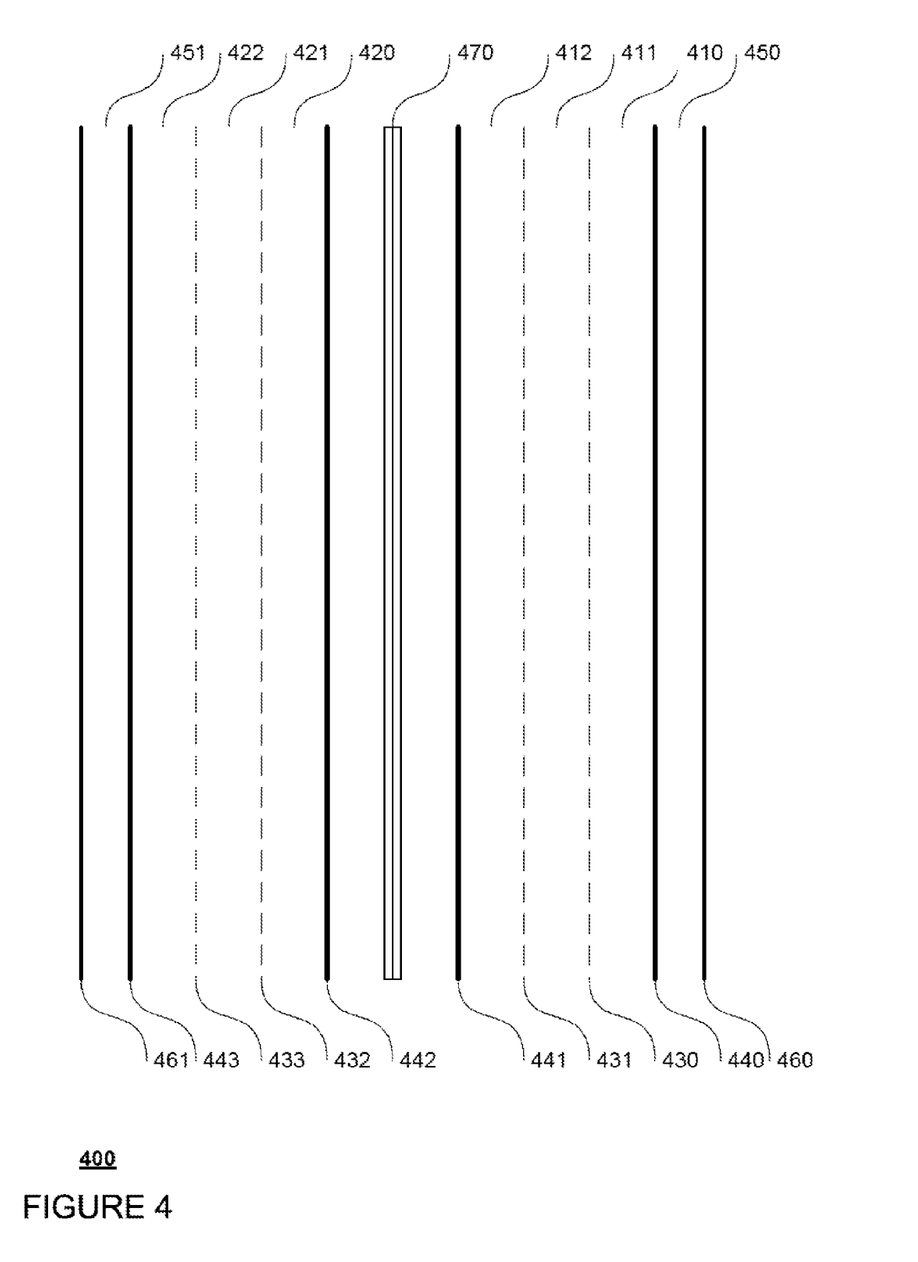
FIG. 4 is an illustration of a highway used by way of example in accordance with aspects of the disclosure.

FIG. 4 is an example of a highway 400. In this example, highway 400 includes 3 northbound lanes 410-412 and 3 southbound lanes 420-22 defined by broken lane lines 430-33 and solid lane lines 440-43. Highway 400 also includes shoulders 450-51 defined between solid lane line 440 and barrier 460 and solid lane line 441 and barrier 461, respectively. Between the northbound and southbound lanes, highway 400 includes a median 470.

Figure 5:
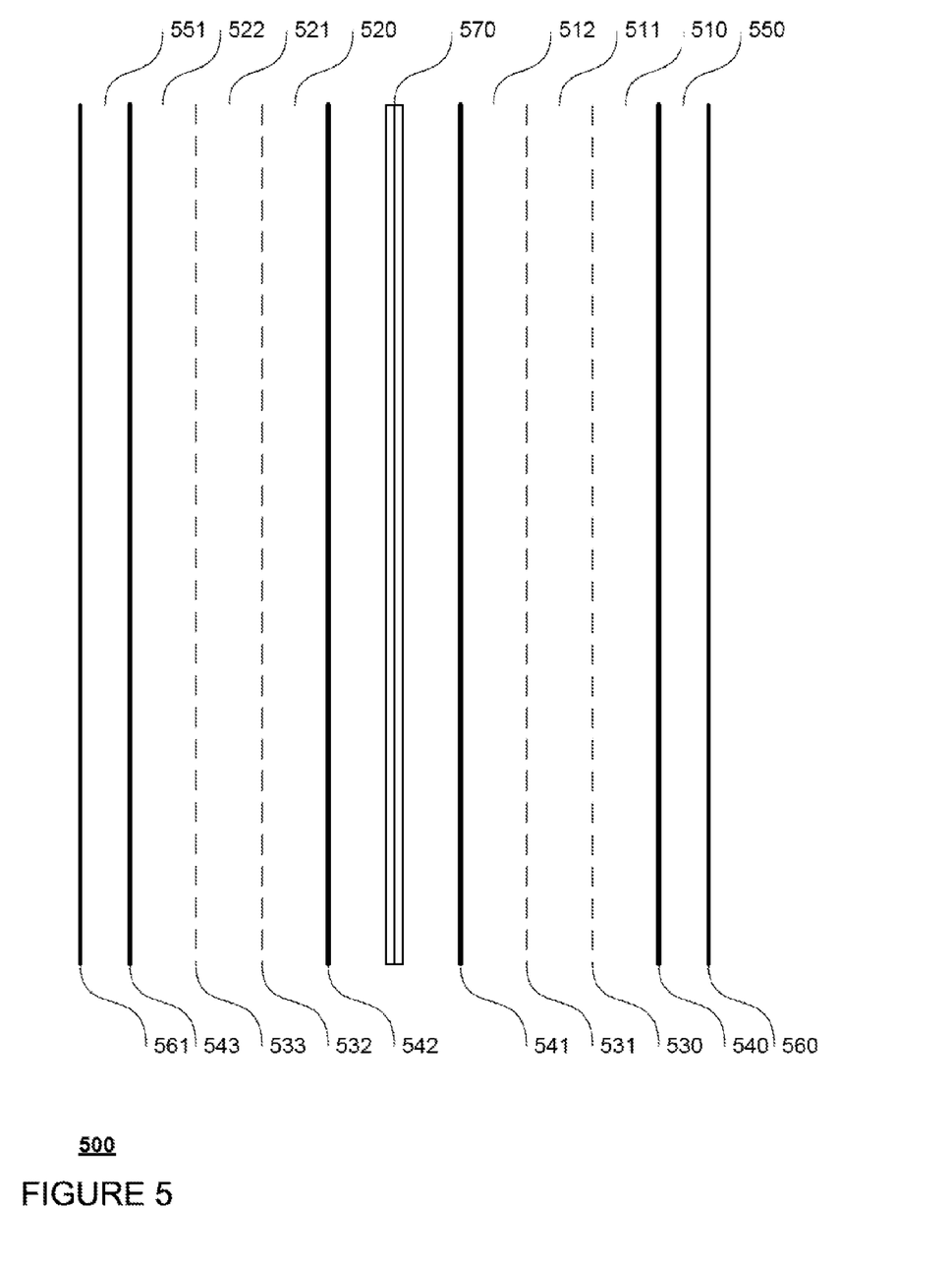
FIG. 5 is an example of map information in accordance with aspects of the disclosure.

FIG. 5 is an example of map information 500 for highway 400. Map information includes data indicating the location and orientation of the various features of highway 400. For example, map information 500 includes northbound lane data 510-512 identifying northbound lanes 410-412 as well as southbound lane data 520-522 identifying southbound lanes 420-22. Map information 500 also includes broken lane line data 530-33 and solid lane lines 540-43 representing broken lane lines 430-33 and solid lane lines 440-43. Shoulders 450-51 are also represented by shoulder data 550-551. Barriers 460-61 are represented by barrier data 560-61, and median 470 is represented by median data 570.

The map information may also include three-dimensional terrain maps incorporating one or more of objects listed above. For example, the vehicle may determine that another object, such as a vehicle, is expected to turn based on real-time data (e.g., using its sensors to determine the current GPS position of another vehicle and whether a turn signal is blinking) and other data (e.g., comparing the GPS position with previously-stored lane-specific map data to determine whether the other vehicle is within a turn lane).

Although the detailed map information 136 is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location whether or not it is linked to other related features. For example, a stop sign may be linked to a road and an intersection. In some examples, the associated data may include grid-based indices of a roadgraph to promote efficient lookup of certain roadgraph features.

Data 134 may store tailgater threshold data 138. This data may include various thresholds for determining whether a vehicle is tailgating. These thresholds may be adapted to the speed of the autonomous vehicles. In one aspect, at slow speeds, or speeds below a speed threshold, the tailgater threshold may be based on distance ($D_{TH}$). For example, any object closer than 3 meters at speeds less than (or equal to) 5 mph may be considered a tailgater. At higher speeds, or speeds below a speed threshold, the tailgater threshold may be based on time ($T_{TH}$). For example, any object closer than 0.7 seconds may be considered a tailgater. These thresholds may be tuned by conducting user studies to determine what following distances people find comfortable or acceptable as well as based on human reaction time in situations that require hard (or abrupt) braking or bad weather. These thresholds may be stored in a table, database, or other data structure such that the given a particular speed, the relevant threshold may be identified quickly.

Data 134 may also store headway buffer data 140. Headway may include the distance between two vehicles divided by the speed of the following vehicle, or in other words, the time it would take the following car to reach the current location of the lead vehicle. Thus, the headway buffer data may define a minimum headway buffer as an amount of time between the autonomous vehicle and a vehicle immediately in front of the autonomous vehicle. The minimum headway buffer may also vary given external factors such as the current driving conditions. For example, different minimum headway buffers may be utilized for surface streets as opposed to highways, rainy conditions as opposed to clear conditions, daytime conditions versus night time conditions.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, an autonomous vehicle may detect and identify various objects, including other vehicles, in the autonomous vehicle's surroundings. For example, using laser data collected by laser 310 and/or 311, computer 101 may detect objects within the range of the lasers. These objects may be identified as vehicles using various methods such as image matching or comparing characteristics such as size, location, speed, heading, etc. In this regard, computer 110 may determine the actual geographic location of objects using data from the sensors described above as well as the detailed map information. In addition, computer 110 may also determine the relative distance between objects and vehicle 101.

Figure 6:
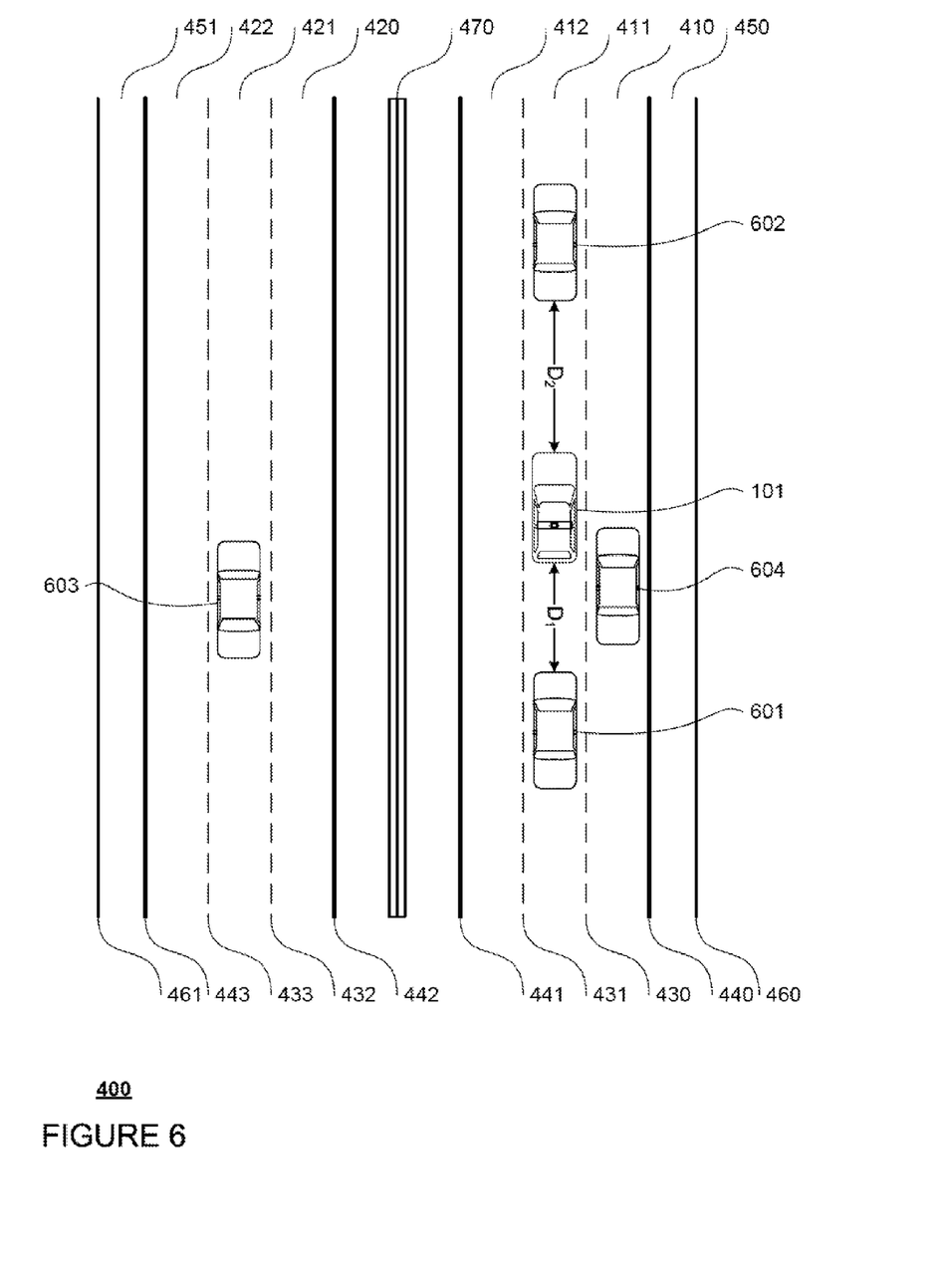
FIG. 6 is another illustration of the highway of FIG. 4.

FIG. 6 is an example of a situation in which vehicle 101 is being driven in an autonomous mode along roadway 400. In this example, computer 110 of vehicle 101 may detect and identify vehicles 601-04 using sensor data received from vehicle 101's various sensors.

The autonomous vehicle may identify a vehicle which could be tailgating the autonomous vehicle or a possible tailgater. For example, this may include objects that are in the same lane as the autonomous vehicle, but located behind the autonomous vehicle. In the example of FIG. 6, vehicle 101 is located in lane 411, vehicles 601 and 602 are located in lane 411, vehicles 603 is in lane 422, and vehicle 604 is in lane 410. Vehicle 601 is located behind vehicle 101 (see rear of FIG. 3) and vehicle 602 is located in front of vehicle 101 (see front of FIG. 3). Thus, in this example, vehicle 601 is located behind vehicle 101 and in the same lane as vehicle 101, so computer 110 may determine that vehicle 601 is a possible tailgater or that computer 110 should determine whether vehicle 601 is a tailgater.

The autonomous vehicle may determine whether any of the identified vehicles are tailgaters. This may include identifying or selecting between two or more different types of thresholds of the threshold data 138. In order to do so, computer 101 may compare the speed of vehicle 101 to a first threshold related to speed. As an example, vehicle 101 may be traveling at speed $S_V$. Computer 101 may compare speed $S_V$ to a speed threshold $S_{TH}$, from the threshold data 138 to select a threshold for determining whether a possible tailgater is a tailgater.

For example, if speed $S_V$ is less than (or equal to) speed $S_{TH}$, for example, computer 101 may identify the threshold $D_{TH}$ defined in distance. Computer 110 may also determine the distance $D_1$ between vehicle 601 and vehicle 101 (or some distance behind vehicle 101 such as a few feet or inches) as shown in FIG. 6. As noted above, this distance $D_1$ may be determined from the line of sight distance or the distance along lane 411 between the actual geographic location of vehicle 601 and the actual geographic location of vehicle 602. Computer 110 may then compare that distance to $D_{TH}$. If $D_1$ is less than (or equal to) $D_{TH}$, computer 110 may determine that vehicle 601 is a tailgater.

If speed $S_V$ is greater than speed $S_{TH}$, for example, computer 101 may identify the threshold $T_{TH}$ defined in time. Computer 110 may calculate a time $T_1$ for how long until vehicle 602 would reach the rear of vehicle 101 (or some distance behind vehicle 101 such as a few feet or inches) if vehicle 101 were stationary. In this example, the speed of vehicle 601 may be assumed to be close to that of vehicle 101, and thus, when determining the how long until the vehicle would reach vehicle 101, the speed $S_V$ may be used. Thus, computer 110 may determine how long it would take a vehicle traveling at a speed of $S_V$ to cover the distance $D_1$ or $T_1=D_1/S_V$. The time $T_1$ may then be compared to the threshold $T_{TH}$. If $T_1$ is less than $T_{TH}$, computer 110 may determine that vehicle 601 is a tailgater, and if $T_{TH}$ is greater than or equal to $T_{TH}$, computer 110 may determine that vehicle 601 is not a tailgater.

Rather than selecting between or identifying different types of threshold values, the computer 110 may define a threshold distance as a function of different types of threshold values. As an example, a threshold function R may include: $R=D_{TH}+T_{TH}*S_v$, where R is the threshold distance, $D_{TH}$ is a threshold defined in distance, $T_{TH}$ is a threshold defined in time, and $S_v$ is the speed of vehicle 101. In this example, where the speed $S_v$ is 0, R will be equal to $D_{TH}$. Where the speed $S_v$ is greater than zero, the threshold $T_{TH}$ will also contribute to the threshold distance R. In this example, the values $D_{TH}$ and $T_{TH}$ may be fixed, for example as 2 meters and 1 second, respectively. Alternatively, these values may be a quadratic term or may vary depending upon the vehicle's environmental conditions. As an example, $D_{TH}$ may be zero when on a highway while $T_{TH}$ may be zero or very small when vehicle 101 is on a surface street.

As another example, the autonomous vehicle may determine whether another vehicle is a tailgater based on features other than or in addition to speed and distance. For example, computer 110 may consider whether the other vehicle is changing lanes to move behind or into another lane from vehicle 101. Computer 110 may detect this behavior, for example, from sensor data from a camera, laser or other sensor indicating that the other vehicle is crossing lane markers or using a turning signal. A vehicle changing lanes may initially appear as a tailgater, but after a few seconds the time or distance between the other vehicle and vehicle 101 may increase or the other vehicle may no longer be in the same lane as vehicle 101. Thus, computer 110 may not identify the other vehicle as a tailgater given the fact that the other vehicle is currently changing lanes.

In yet another example, a vehicle may be identified as a tailgater using a machine learning classifier. For example, a training set of vehicle data along with classification labels identifying whether the vehicle data indicated a tailgater or not a tailgater may be input into a machine learning algorithm. The vehicle data may include, for example, the speed of two vehicles, changes in speeds of the vehicles over time, the distances between the vehicles, information about the location of the vehicles (highway versus surface street, etc.), and other measurements or information. This training set may be used to generate a classifier. Characteristics for possible tailgaters are then input into the classifier and the output identifies whether the possible tailgater is actually tailgating vehicle 101.

Once a vehicle has been identified as a tailgater, the autonomous vehicle may provide various notifications. For example, computer 110 may notify passengers of vehicle 101 audibly using a tone or voice alert or visually using an icon on an in-dash or other display. In addition, computer 110 may provide audible or visual warnings to the driver and/or passengers of vehicle 601 to indicate that the vehicle 601 is tailgating. An example of an external visual notification may include a light on the back of the car that turns on to draw attention of the driver of the tailgating vehicle. In another example, the notification about the tailgater may be suppressed. For example, vehicle 101 may be fully stopped or is aggressively accelerating, thereby increasing vehicle 101's speed and the time and distance between the tailgater and vehicle 101.

The autonomous vehicle may also respond by modifying its driving behavior. In one example, the autonomous vehicle may change lanes to avoid the tailgater. The autonomous vehicle could then let the tailgater pass and return to its original lane.

In another example, the autonomous vehicle may respond by adjusting the headway buffer from a vehicle in front of the autonomous vehicle. For example, computer 110 may maintain a minimum headway buffer defined in the headway buffer data 140 between vehicle 101 and a vehicle in the same lane as and in front of vehicle 101. When there is a tailgater following the autonomous vehicle, the autonomous vehicle may increase this minimum headway buffer.

In the example of FIG. 6, the distance between vehicle 101 and 602 is $D_2$. Assuming that vehicle 101 is maintaining the minimum headway buffer between vehicle 101 and vehicle 602, the minimum headway buffer (which is defined in time) between vehicle 101 and 602 would be the time $H_v$ it would take vehicle 101 to travel the distance $D_2$ or $H_v=D_2/S_v$. Computer 110 may control vehicle 101 so that $H_v$ is always greater than or equal to a minimum headway buffer H.

Figure 7A:
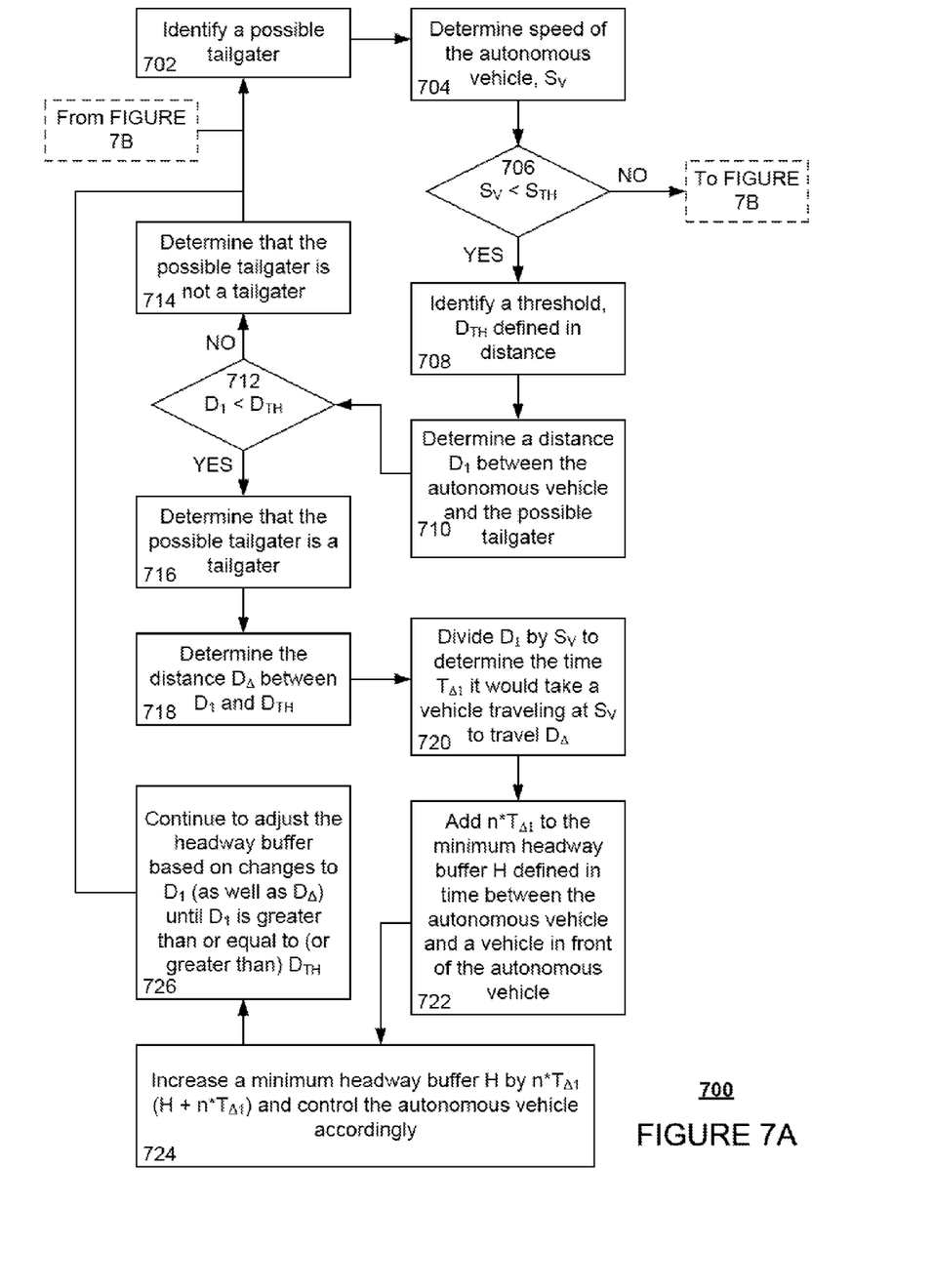
FIGS. 7A and 7B a flow diagram in accordance with aspects of the disclosure.

As another example, when vehicle 101 is traveling at speed $S_v$ which is less than (or equal to) speed $S_{TH}$, the computer 110 may determine the distance $D_A$ between $D_1$ and $D_{TH}$. The computer may then determine the time, $T_{A1}$, that it would take a vehicle traveling at speed $S_v$ to travel the distance $D_A$ by dividing $D_A$ by $S_v$. Computer 110 may then increase the minimum headway buffer H between vehicle 101 and the vehicle in front of it (in the example of FIG. 6, vehicle 602) by a fraction, integer, or function of time $T_{A1}$. In the example, of FIG. 7, computer 110 may control vehicle 101 such that the headway between vehicle 101 and vehicle 602 is greater than (or equal to) $H+(n*T_{A1})$. This amount n may be a fraction (such as ⅓ or ½), percentage (such as 25% or 0.75), or some numerical value (such as 1, 2, etc.). For example, if n=1 and the tailgater is 0.5 seconds too close to vehicle 101 ($T_{A1}$= 0.5 s), the minimum headway buffer H may be increased by 1*0.5 s or 0.5 s. Alternatively, the headway buffer may be increased by some function f of the time $T_{A2}$. This function f may be learned from human driving styles using machine-learning techniques.

In addition, the computer may adjust the headway buffer further based on any changes to $D_1$ (and $D_A$). This may continue until the computer determines that tailgater is no longer tailgating the autonomous vehicle (or $D_1$ is greater than $D_{TH}$).

When vehicle 101 is traveling at speed $S_V$ which is greater than or equal to speed $S_{TH}$ and computer 110 has determined that another vehicle is a tailgater by determining $T_1$, the computer may determine the time difference $T_{A2}$ between $T_1$ and $T_{TH}$. Computer 110 may then increase the minimum headway buffer H between vehicle 101 and the vehicle in front of it (in the example of FIG. 6, vehicle 602) by a fraction, integer, or function of time $T_{A2}$. Using the example of a value n discussed above, time $T_{A2}$ may be multiplied by n and added to H. Thus, computer 110 may control vehicle 101 such that the minimum headway buffer between vehicle 101 and vehicle 602 is greater than or equal to $H+(n*T_{A2})$. Again, alternatively, the headway buffer may be increased by some function f of the time $T_{A2}$. This function f may be learned from human driving styles using machine-learning techniques.

In addition, the computer may adjust the headway buffer further based on any changes to $T_1$ or $S_v$. This may continue until the computer determines that tailgater is no longer tailgating the autonomous vehicle (or $T_1$ is greater than $T_{TH}$).

Figure 7B:
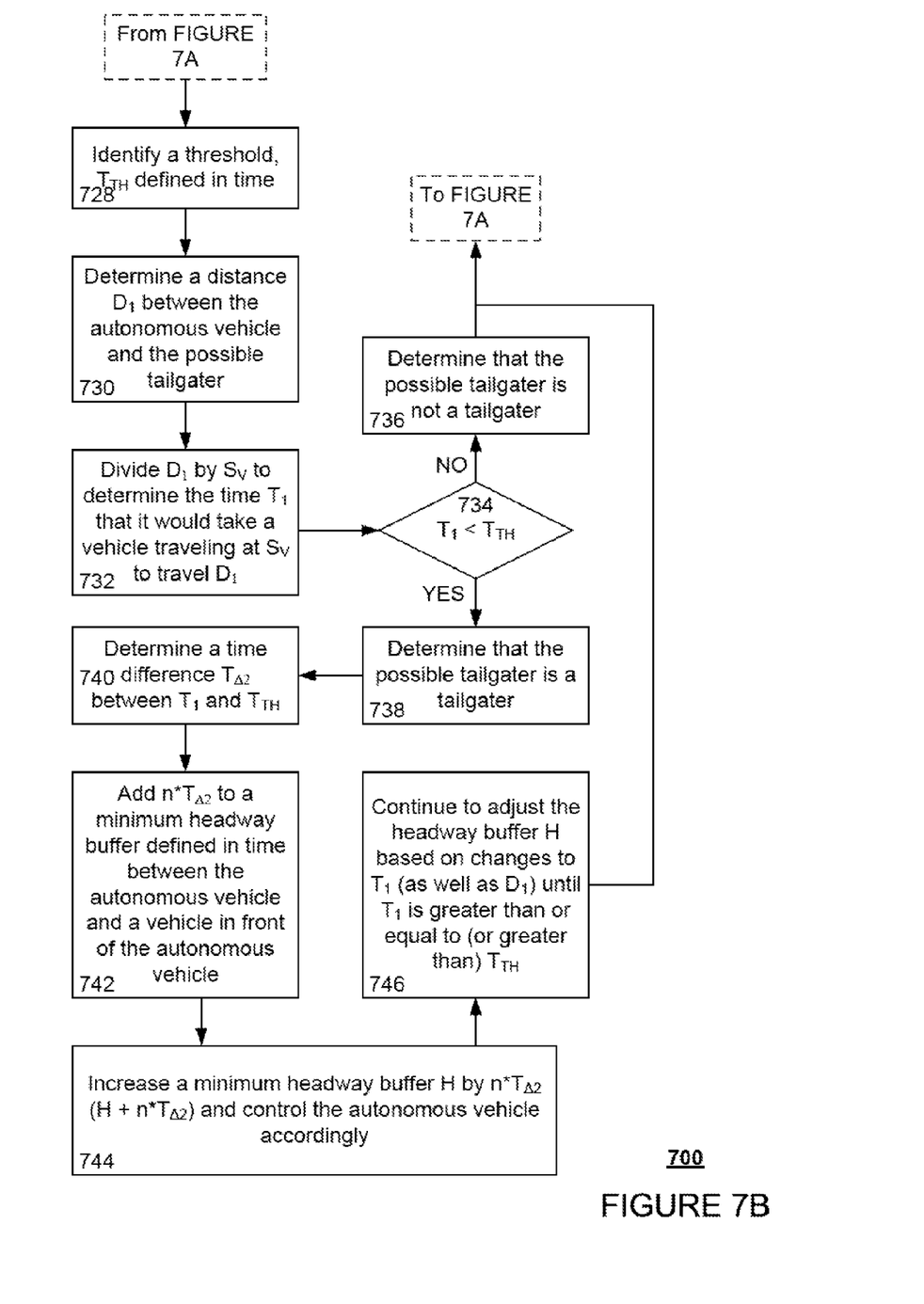

FIGS. 7A and 7B are an example flow diagram 700 of steps that may be performed by a computer of an autonomous vehicle, such as computer 110 of vehicle 101. In this example, computer 110 identifies another vehicle that may be tailgating or "a possible tailgater" at block 702. As discussed above, this may include processing data received from various sensors to detect objects that are traveling behind the autonomous vehicle and in the same lane. The computer also determines the vehicle's current speed $S_V$ at block 704. This speed $S_V$ is compared to a speed threshold $S_{TH}$ at block 706 in order to identify a threshold for determining whether the possible tailgater is actually tailgating. If $S_V$ is less than (or equal to) $S_{TH}$, the computer may identify a threshold $D_{TH}$ defined in distance at block 708. The computer determines a distance $D_1$ between the autonomous vehicle and the possible tailgater at block 710. Next the computer compares $D_{TH}$ to $D_1$ at block 712 to determine whether the possible tailgater is a tailgater. If $D_1$ is greater than $D_{TH}$, the computer determines that the possible tailgater is not a tailgater at block 714. The computer may then return to block 702 to identify other possible tailgaters.

Returning to block 712, if $D_1$ is less than (or equal to) $D_{TH}$, the computer determines that the possible tailgater is a tailgater at block 716. The computer may then respond by determining a distance $D_A$ between $D_1$ and $D_{TH}$ at block 718. Computer then divides $D_1$ by $S_V$ to determine the time $T_{A1}$ that it would take a vehicle traveling at $S_V$ to travel $D_A$ at block 720. The time $T_{A1}$ is then added by the computer to a minimum headway buffer H defined in time between the autonomous vehicle and a vehicle in front of the autonomous vehicle at block 722. Computer 110 may then increase the minimum headway buffer H between vehicle 101 and the vehicle in front of it by a fraction, integer, or function of time $T_{A1}$. Using the example of a value n discussed above, time $T_{A1}$ may be multiplied by n and added to H. Thus, Computer then increases a minimum headway buffer H (described above) by $n*T_{A1}+H$ at block 724. Again, alternatively, the headway buffer may be increased by some function f of the time $T_{A1}$. This function f may be learned from human driving styles using machine-learning techniques.

The computer may continue to adjust the headway buffer based on changes to $D_1$ (as well as $S_v$) until $D_1$ is greater than or equal to $D_{TH}$ at block 726. The computer then continues to identify other potential tailgaters at block 702.

Returning to block 706, if $S_V$ is greater than or equal to $S_{TH}$, the computer may identify a threshold $T_{TH}$ defined in time at block 728 of FIG. 7B. The computer determines a distance $D_1$ between the autonomous vehicle and the possible tailgater at block 730. Next the computer divides $D_1$ by $S_V$ to determine the time $T_1$ it would take a vehicle traveling at speed $S_V$ to travel the distance $D_1$ at block 732. The computer compares $T_1$ to $T_{TH}$ at block 734 to determine whether the possible tailgater is a tailgater. If $T_1$ is greater than $T_{TH}$, the computer determines that the possible tailgater is not a tailgater at block 736. The computer may then return to block 702 of FIG. 7A to identify other possible tailgaters.

Returning to block 734 of FIG. 7B, if $T_1$ is less than (or equal to) $T_{TH}$, the computer determines that the possible tailgater is a tailgater at block 738. The computer may respond by determining the time difference $T_{A2}$ between $T_1$ and $T_{TH}$ at block 740. The time $T_{A2}$ is then added by the computer to a minimum headway buffer H defined in time between the autonomous vehicle and a vehicle in front of the autonomous vehicle at block 742. Computer 110 may then increase the minimum headway buffer H between vehicle 101 and the vehicle in front of it by a fraction, integer, or function of time $T_{A2}$. Using the example of a value n discussed above, time $T_{A2}$ may be multiplied by n and added to H. Thus, computer increases a minimum headway buffer H (described above) by $n*T_{A2}+H$ at block 744. Again, alternatively, the headway buffer may be increased by some function f of the time $T_{A2}$. This function f may be learned from human driving styles using machine-learning techniques.

The computer may continue to adjust the headway buffer H based on changes to $T_1$ (as well as $S_v$ and $D_1$) until $D_1$ is greater than or equal to $T_{TH}$ at block 746. The computer then continues to identify other potential tailgaters at block 702 of FIG. 7A.

By adjusting the minimum headway buffer, as described above, the autonomous vehicle may account for human reaction times, such as where the autonomous vehicle requires the driver to take control of the autonomous vehicle. As an example, assuming a constant human reaction time, if the tailgater decreased the time buffer for reacting to an unexpected situation by some value, computer 110 may increase vehicle 101's time buffer by the same amount to compensate, allowing computer 110 to maintain the same level risk for situations that require sudden braking.

Alternatively, or in addition to adjusting the headway buffer, the autonomous vehicle may also adjust its braking profile or pattern. Once a tailgater is identified, the autonomous vehicle could modify its braking profile when approaching slower (or stopped) vehicles. For example, computer 110 could cause vehicle 101 to brake more aggressively earlier to draw attention of the vehicle behind (while monitoring its state) in order to leave more room to maneuver later. As another example, if there is a vehicle in front of the autonomous vehicle which would require aggressive braking, the autonomous vehicle may begin with a more gradual braking pattern and transition to more aggressive braking or the autonomous vehicle may initially brake hard (in a burst pattern), relax the braking a bit and then more gradually increase the braking power. These patterns would allow the tailgater to see the brake lights of the autonomous vehicle and may give the tailgater more to realize the need to also brake aggressively.

In one example, before determining whether another vehicle is a tailgater, the autonomous vehicle may observe the vehicle for an observation period of a few seconds or less. If the other vehicle is driving slower than the autonomous vehicle, this observation period may allow the autonomous vehicle to eliminate false positives such as vehicles that are moving through a lane or increasing the distance between themselves and the autonomous vehicle.

The detection and notification features described above could also be used in vehicles that are not necessarily capable of fully autonomous driving modes, such as vehicles without any automatic control or vehicles with semiautonomous modes such as cruise control or advanced cruise control features.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
    detecting, by one or more processors associated with a first vehicle, a second vehicle driving behind the first vehicle and in a same lane as the first vehicle;
    detecting, by the one or more processors, a third vehicle driving in front of the first vehicle and in the same lane as the first vehicle;
    determining, by the one or more processors, a threshold tailgating value according to a threshold function having a first term that is dependent upon a current speed of the first vehicle and a second term that is independent of the current speed of the first vehicle;
    determining, by the one or more processors, whether the second vehicle is within the threshold tailgating value of the first vehicle;
    when the second vehicle is within the threshold tailgating value, determining, by the one or more processors, a difference value between the threshold tailgating distance and a difference between the locations of the second vehicle and the first vehicle;
    adjusting, by the one or more processors, a distance between the first vehicle and the third vehicle based on the difference in distance.

2. The method of claim 1, wherein adjusting the distance between the first vehicle and the third vehicle further includes:
    retrieving a minimum headway time defining a minimum driving time between the first vehicle and any vehicle immediately in front of the first vehicle;
    determining an amount of time to travel the difference; and
    adjusting the minimum headway time based on the amount of time.

3. The method of claim 2, further comprising further adjusting the adjusted minimum headway time based on any changes to the current speed of the first vehicle.

4. The method of claim 2, further comprising further adjusting the adjusted the minimum headway time based on any changes to the difference in distance.

5. The method of claim 2, further comprising continuing to adjust the adjusted minimum headway time until the distance between the first vehicle and the tailgater is greater than or equal to the distance threshold.

6. The method of claim 1, wherein the second term includes a distance threshold component, and the threshold function further includes a third term including a time threshold component.

7. The method of claim 1, further comprising determining the second term based on whether the current speed of the first vehicle is greater than a speed threshold.

8. The method of claim 1, further comprising:
    determining an amount of time for the first vehicle to travel the difference between the locations of the first vehicle and the second vehicle;
    wherein adjusting the distance between the first vehicle and the third vehicle based on the amount of time.

9. The method of claim 1, further comprising:
    determining an amount of time for the first vehicle to travel the difference between the locations of the first vehicle and the second vehicle;
    wherein adjusting the distance between the first vehicle and the third vehicle based on the amount of time.

10. The method of claim 1, further comprising:
    determining the second term based upon a type of roadway on which the first vehicle is currently driving; and
    determining the first term based upon the type of roadway on which the first vehicle is currently driving.

11. The method of claim 1, wherein the first term is determined to be zero when the type of roadway is a highway.

12. The method of claim 1, wherein the second term is determined to be zero when the type of roadway is a surface street.

13. The method of claim 1, wherein the first term and second term are fixed values.

14. A system comprising one or more computing devices associated with a first vehicle and having one or more processors configured to:
    detect a second vehicle driving behind the first vehicle and in a same lane as the first vehicle;
    detect a third vehicle driving in front of the first vehicle and in the same lane as the first vehicle;
    determine a threshold tailgating value according to a threshold function having a first term that is dependent upon a current speed of the first vehicle and a second term that is independent of the current speed of the first vehicle;
    determine whether the second vehicle is within the threshold tailgating value of the first vehicle;
    when the second vehicle is within the threshold tailgating value, determine a difference value between the threshold tailgating distance and a difference between the locations of the second vehicle and the first vehicle;
    adjust a distance between the first vehicle and the third vehicle based on the difference in distance.

15. The system of claim 14, wherein the second term includes a distance threshold component, and the threshold function further includes a third term including a time threshold component.

16. The system of claim 14, further comprising determining the second term based on whether the current speed of the first vehicle is greater than a speed threshold.

17. The system of claim 14, further comprising:
determining an amount of time for the first vehicle to travel the difference between the locations of the first vehicle and the second vehicle;
wherein adjusting the distance between the first vehicle and the third vehicle based on the amount of time.

18. The system of claim 14, wherein the one or more computing devices are further configured to:
determine the second term based upon a type of roadway on which the first vehicle is currently driving.

19. The system of claim 18, wherein the one or more computing devices are further configured to determine the first term based upon the type of roadway on which the first vehicle is currently driving.

20. The system of claim 14, wherein the first term and second term are fixed values.

* * * * *